May 7, 1974 R. J. GELIN 3,809,739
HIGH SPEED MOLDING PROCESS
Original Filed Dec. 9, 1969 3 Sheets-Sheet 1

INVENTOR.
ROBERT J. GELIN
BY
*Staelin & Overman*
ATTORNEYS

INVENTOR.
ROBERT J. GELIN

United States Patent Office 3,809,739
Patented May 7, 1974

3,809,739
HIGH SPEED MOLDING PROCESS
Robert J. Gelin, Newark, Ohio, assignor to Owens-Corning Fiberglas Corporation, Toledo, Ohio
Continuation of abandoned application Ser. No. 883,542, Dec. 9, 1969. This application Mar. 13, 1972, Ser. No. 234,297
Int. Cl. B29g 1/00
U.S. Cl. 264—297                          6 Claims

ABSTRACT OF THE DISCLOSURE

A high speed molding system for forming molded plastic articles which has a plurality of latching molds which are sequentially presented to a single molding press. After a mold is moved in open position to the press by a conveyor, molding pressure is applied to molding composition between the mold halves and the mold is mechanically latched within the press. An inflatable bag is expanded within the latched mold to apply and maintain mold pressure after the latched mold is released from the press. The latched mold is then conveyed from the press, while curing, to an unloading station and, after the formed article is removed, is cleaned and returned to the press for subsequent use.

---

This is a continuation of application Ser. No. 883,542, filed Dec. 9, 1969 now abandoned.

This invention relates to a molding system particularly designed for the high speed production of a plurality of compression molded articles which require a relatively high molding force and in which the molding material must remain under compression for a predetermined cure or hardening time.

One of the difficulties encountered in molding relatively large articles of a hardenable plastic material is in attaining an appreciable volume of production without the expense of providing a large number of molding presses. This is particularly true when molding large parts having glass fiber reinforcement, when the thickness of the molded part is substantial and when its large size requires a relatively high molding force to deform the uncured or unhardened molding material containing the glass fibers.

In order to increase the volume per hour of such large parts, it has been heretofore necessary to provide a plurality of separate molding presses which, in the case of very large parts, becomes prohibitively expensive if very large molding forces and thus high press capacities are required. In addition, the amount of space required for such presses adds to the cost of the operation, along with press maintenance and labor costs, etc.

It is a primary object of this invention to provide a high speed molding system capable of a high volume output of relatively large, glass fiber reinforced molded products which is accomplished through use of a single molding press and in which the volume output is substantially independent of the cure or hardening time required for the molded article. This object is accomplished through use of a plurality of latching mold assemblies which, once loaded and compressed within the single press, can be latched or otherwise secured together and include a means for applying and maintaining additional molding pressure independently of the press so that the press may be released and used with subsequent mold assemblies while others previously latched are undergoing the cure or hardening interval required. As used herein, the term curing interval shall refer to the cure time required for thermosetting materials or the hardening time required by thermoplastic materials.

The molding system of this invention contemplates the use of a single high force capacity molding press with a plurality of individual latching molds which can be sequentally fed to the molding press. Each of the latching mold assemblies includes an expandable means within the mold assembly itself which, independently of the press, can apply and maintain additional molding force on the article being molded so that the article within each of the molds can undergo a cure time of a predetermined interval, while the single press is being used to act upon subsequent mold assemblies. The molding system of this invention utilizes a continuous process in which the latched mold assemblies are sequentially loaded by the press, latched, put under additional molding pressure by the expandable device, and are conveyed away from the press, during the curing period, to an unloading station where, after unloading, they are returned to the press for subsequent use.

Other objects and advantages of the invention will be apparent from the following description of certain embodiments thereof, with reference being made to the accompanying drawings in which.

Figure 1:
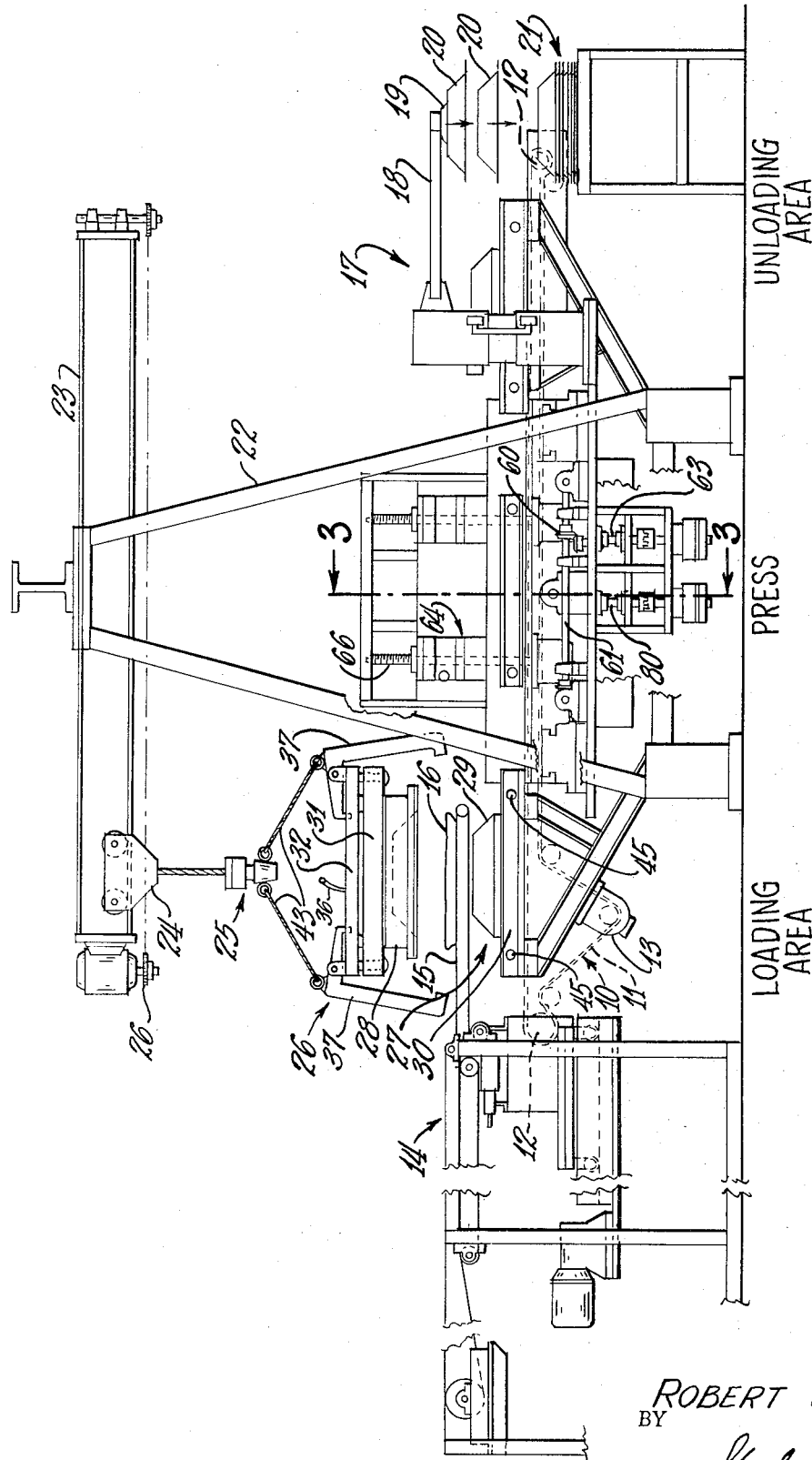
FIG. 1 is a view in elevation of one form of a molding apparatus of this invention, showing a single molding press with one of the latched mold assemblies of this invetion about to be loaded into the press.

Referring first to FIG. 1, an apparatus is illustrated in an embodiment which includes a single molding press positioned between a loading area and an unloading area with a horizontally extending transfer mechanism 10 extending therebetween. The apparatus shown in FIG. 1 can be used with a single mold assembly with the single press for low capacity installations and illustrates the operation of the latching mold assemblies. However, the advantages of this system are obtained when two or more of the mold assemblies are used with a single press, as explained below in connection with FIG. 2.

The transfer mechanism 10 can be a belt type conveyor or a stationary table with an endless chain for moving the mold assemblies from the loading area through the press to the unloading area. As schematically shown in FIG. 1, an endless conveyor belt 11 has its upper reach extending between a pair of rollers 12 positioned at each end at the loading area and unloading area. A drive motor 13 moves the conveyor belt 11 and is reversible so that the mold assembly can be moved back and forth between the loading and unloading stations.

To the left of the loading area as shown in FIG. 1 is a molding material supply device which is schematically shown as a second conveyor 14 having a retractable portion 15 extending over the loading area. Preferably, the supply conveyor 14 is of the type which will deposit a charge of molding material, such as sheet molding material containing uncured molding compound and glass fiber reinforcement, directly upon the lower half of a mold assembly in the loading area without relative motion between the mold assembly and the charge of material designated by reference numeral 16. Such zero relative motion devices are known to those skilled in the art and will not be further described in detail. It is to be understood that other devices for supplying the molding material to the loading area can be used and that the details of such devices do not constitute an important part of this invention.

The molded part to be formed is illustrated as a trapezoidal shaped dish and is removed from the open mold in the unloading area by an unloading device generally designated by reference numeral 17. The unloading device 17 includes a movable arm 18 having a vacuum pickup member 19 to remove the newly formed article 20 from the lower portion of the mold assembly and to deposit it upon a stack 21 of previously formed articles. Again, the construction and details of the unloading apparatus do not constitute an important part of this invention. The design of both the loading and unloading devices will be dictated by the type of article being formed, the rate of production and other factors. In addition, the loading or unloading may be manually performed.

The molding press of the embodiment shown in FIG. 1 includes a vertically extending frame 22 which supports a horizontal carrier track 23 spaced above and parallel to the upper reach of the conveyor belt 11. A trolley 24 and its hoist 25 are driven along the carrier track 23 by a drive motor and chain 26, as schematically shown. The upper platen transfer hoist 25 is used to return the upper half of the die assembly, generally designated by reference numeral 26, from the unloading area to the loading area and to position it over the lower half of the die assembly, generally designated by reference numeral 27. Of course, a similar transfer system can be readily adapted to handle more than one die assembly in order to utilize the press during the cure interval of the molded parts, as previously explained.

Figure 4:
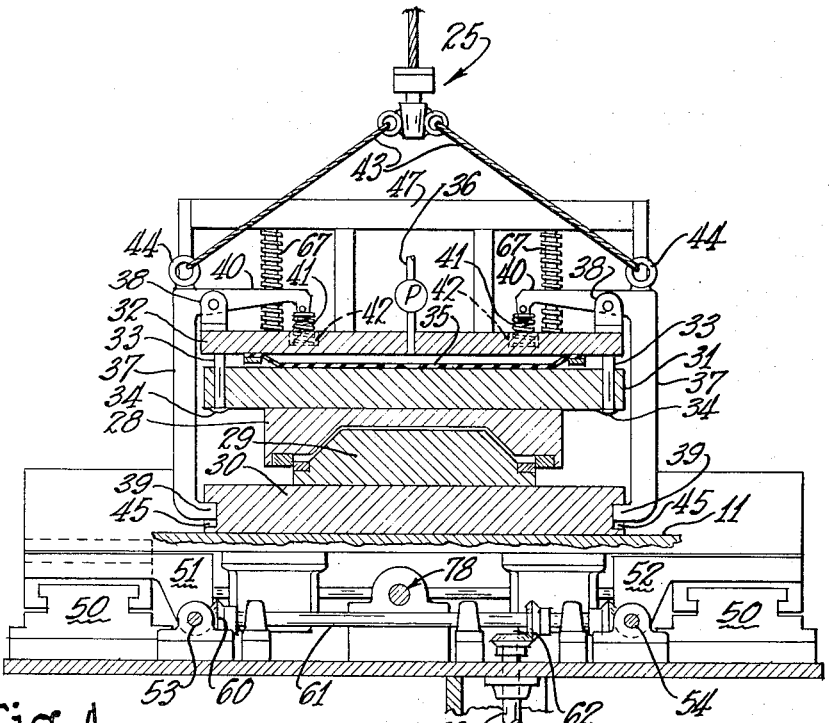
FIG. 4 is a cross sectional view in elevation of the molding press of FIG. 1, showing one of the molding assemblies in latched, closed position.

Referring to FIG. 4, the mold assemblies used with the apparatus and process of this invention each include a pair of matched upper and lower dies 28 and 29 which, when mated as shown in FIG. 4, form the mold cavity for the article or dish 20 being formed. The lower die 29 is secured to a lower platen or back-up member 30 which rests upon the conveyor 11. The upper die 28 is secured to an upper platen or back-up member 31. The dies 28 and 29 may be removably secured to their respective platens 30 and 31 so that different dies can be interchanged with the same platens.

Above the upper platen 31 is a bolster plate 32 having a plurality of support pins 33 secured to and extending downwardly from its lower side through passages in the upper platen 31 and terminating in enlarged stops 34. Between the bolster plate 32 and the upper surface of the upper platen 31 is an expandable diaphragm or pneumatic bag 35 whose surface area is substantially coextensive with that of the dies 28 and 29. A fluid supply and vent line 36 is connected to the interior of the pneumatic bag 35 and to a fluid pressure supply and controls (not shown) which are operated to supply fluid under pressure to the bag 35 and to vent the bag for deflation thereof.

A plurality of securing means or latch members 37 are provided to mechanically secure together the upper and lower platens 30 and 31 after they have been moved to closed position as shown in FIG. 4. In the embodiment shown, four such latch members 37 are positioned in opposed pairs adjacent the corners of the mold assembly, as schematically indicated in the assemblies shown in FIG. 2. With larger mold assemblies, it may be necessary to provide additional latch members 37 to compensate for larger stresses imposed upon the platens. Each latch member 37 is pivoted to a flange 38 secured to the upper edge of the bolster plate 32, as best seen in FIGS. 1 and 4, and has a downwardly extending arm terminating in a hooked finger 39. An upper lever arm 40 has one end resting upon a compression spring 41 placed within a spring socket 42 in the bolster plate 32. In the embodiment described, the hoist 25 supported by the trolley 24 is attached to a bridle 43 which has its spread ends secured to rings 44 secured to the latch members 37 outside of the pivot connection at the flange 38. It will be seen that, when the hoist 25 is supporting the upper half of the mold assembly as shown in FIG. 1, the bridle 43 connected to the rings 44 causes the latch members 37 to pivot to an open position with the hooked fingers 39 moved outwardly. When the upper half of the mold assembly is rested upon the lower half of the mold assembly to release tension upon the bridle 43, as shown in FIG. 4, the springs 44 cause the latch members 37 to pivot inwardly so that the hooked fingers 39 will engage the sides and latch into recessed pockets 45 in the lower platen 30. The ends of the hooked fingers 39 may be provided with beveled edges so that the latch mechanism automatically seats in the pockets 45 as soon as the pockets 45 and fingers 39 are brought into vertical alignment by the molding press, as will be subsequently explained. In another embodiment of the latch members 37 the upper edges of the lower platen 30 and lower edges of the hooked fingers 39 are chamfered so that the fingers 39 will slide over the edges of the platen 30 and into the pockets 45 as the upper die assembly 26 is lowered upon the lower assembly 27.

Figure 3:
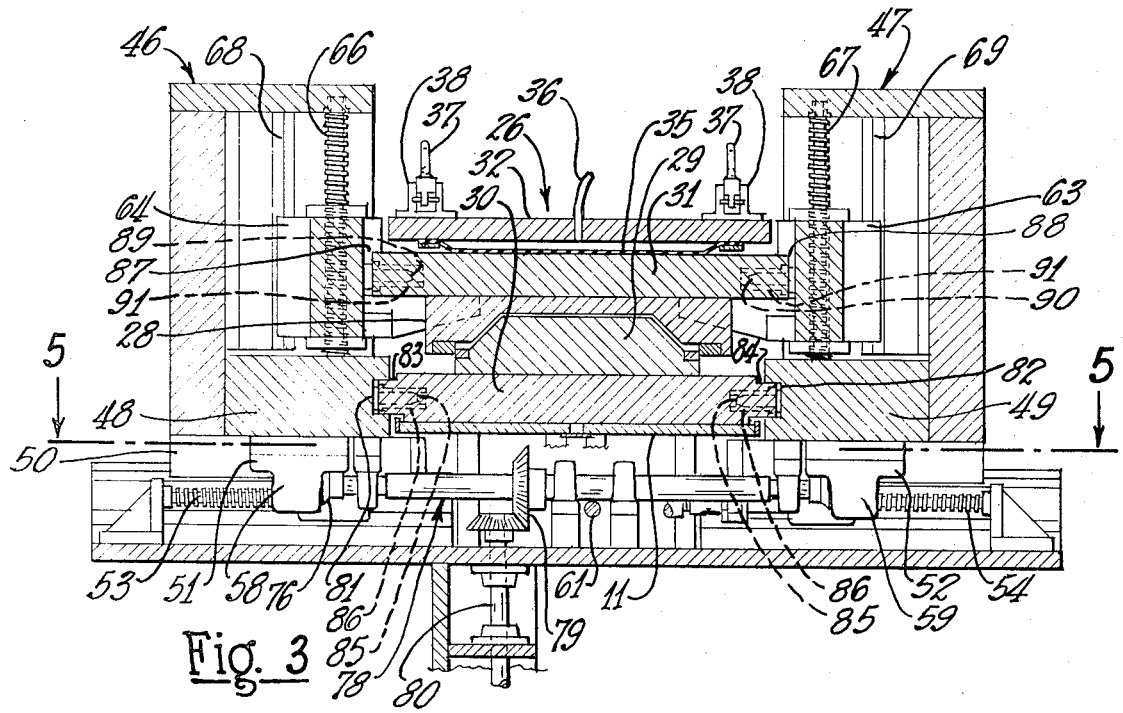
FIG. 3 is a cross sectional view in elevation of the molding press of this invention, taken along line 3—3 of FIG. 1 and shown on an enlarged scale.
Figure 5:
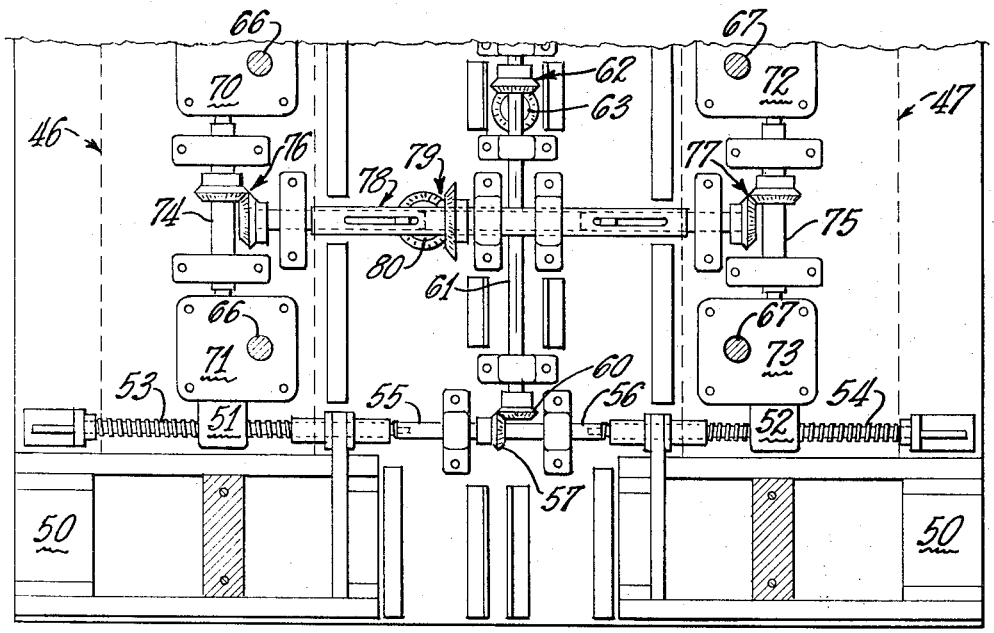
FIG. 5 is a plan view of portions of the press drive apparatus, taken along line 5—5 of FIG. 3.

Referring to FIG. 3, the single molding press used with this invention includes a pair of spaced apart lateral carriages 46 and 47 positioned on each side of the conveyor belt 11 with means for moving the carriages 46 and 47 inwardly and outwardly, toward and away from each other. The particular mechanism for moving the carriages does not constitute an important part of this invention but briefly is described as follows. The carriages include a base 48 or 49 slidably supported upon a horizontal support table 50 with a downwardly extending flange 51 or 52 secured to the base 48 or 49, respectively. Below the table 50, as best seen in FIG. 5, are pairs of coaxial, oppositely threaded worm screws 53 and 54 connected by stub shafts 55 and 56 to a bevel drive gear 57. Referring again to FIG. 3, a worm follower 58 or 59 is secured to the flanges 51 or 52, respectively, and is engaged with the worm screws 53 or 54 such that rotation thereof will cause the worm followers 58 and 59 and thus the carriages 46 and 47 to move outwardly or inwardly together. As seen in FIG. 5, a bevel gear 60 engaged with the bevel drive gear 57 is secured to a central drive shaft 61 which is in turn connected by a gear connection 62 to the vertical drive shaft 63 extending below the conveyor 11, as shown in FIG. 3. A motor drives the vertical drive shaft 63 in either direction.

Each of the laterally moving carriages 46 and 47 includes a vertically moving press mechanism for engaging the mold assemblies and moving them into closed position. The press mechanism, as best seen in FIG. 3, includes a press head 64 or 65 slidably positioned within the carriages 46 or 47, respectively, for vertical movement. A pair of vertically extending jack screws 66 or 67 extends through each of the press heads 64 or 65, respectively, so that rotation thereof will move the press heads 64 or 65 up or down in their vertical slideways 68 or 69 in the carriages 46 or 47.

The jack screws 66 and 67 are driven by an apparatus seen best in FIG. 5. Each of the pairs of jack screws 66 and 67 extend from a reduction gear box 70–73. The input shaft of each of the gear boxes 70–73 is driven by a connecting shaft 74 or 75 which is turned by bevel gear connections 76 or 77, respectively. The gear connections 76 or 77 are driven by an axially extensible shaft 78, which must be utilized because of the inward and outward movement of the carriages 46 and 47. The extensible shaft 78 is driven by a bevel gear connection 79 which is turned by a second vertically extending shaft 80 which extends below the table 50 to a power source.

Referring to FIG. 3, the inner faces of the bases 48 and 49 contain grooves 81 and 82, respectively, for receiving a complementarily shaped flange 83 on the sides of the lower platen 30. Extending from the grooves 81 and 82 are tapered guide pins 85 which fit within guide pin recesses 86 in the sides of the lower platen. Each of the press heads 64 and 65 have grooves 87 and 88 and guide pins 89 and 90 which also seat within guide pin recesses 91 in the upper platen 31. Thus when the mold assembly is placed on the conveyor 11 between the press carriages 46 and 47, the inward movement of these carriages 46 and 47 initially aligns the upper and lower platens 30 and 31 by the guide pins 84, 85, 89 and 90 sliding into the guide pin recesses 86 and 91 in the upper and lower platens 30 and 31. Further inward movement of the carriages 46 and 47 causes the edges of the upper and lower platens 30 and 31 to fit within the grooves 81, 82, 87 and 88 of the carriages 46 and 47 so that the vertical forces of compression exerted by the press will not bear upon the conveyor 11.

The sequence of loading a mold assembly with a charge of hardenable material and closing it within the press is briefly as follows. Referring to FIG. 1, with the lower half assembly 27 in position upon the conveyor 11, a charge 16 of hardenable material, such as sheet molding material containing glass fibers, is laid upon the lower die 29 by the supply conveyor 14. When the retractable portion 15 of the conveyor 14 is retracted, the upper half assembly 26 is lowered by the hoist 25 until it rests upon the lower half assembly 27 and charge of material 16. In this position, the upper and lower halves 26 and 27 are moved by the conveyor 11 into the press area between the carriages 46 and 47. At this time, precise alignment of the upper and lower halves 26 and 27 will not yet be accomplished so that the relatively simple hoist mechanism 25 can be used to roughly position the upper half 26 upon the lower half 27. With the mold assembly placed within the press, the carriages 46 and 47, with the press heads 64 and 65 in partially elevated position, are closed so that the guide pins 84, 85, 89 and 90 seat within the recesses 86 and 91 in the upper and lower platens 30 and 31, respectively. This brings the mold halves 26 and 27 into precise alignment. Once the carriages 46 and 47 are fully closed, the precise alignment necessary for a molding operation has been accomplished and the platens 30 and 31 are now firmly gripped between the press heads 64 and 65 and the base members 48 and 49, respectively. Movement of the carriages 46 and 47 is accomplished through the drive train previously described and shown in FIG. 5.

With no tension on the hoist 25 and bridle 43, which have been relaxed by lowering the hoist, the press heads 64 and 65 are lowered, through the drive mechanism previously described and shown in FIG. 5, to exert initial molding force upon the charge of material 16 and to close the dies 28 and 29 upon each other to provide the mold cavity. When the dies 28 and 29 reach their closed position, the latches 37 will automatically lock as the springs 41 cause them to pivot until the hooked fingers 39 are locked within the pockets 45 in the lower mold 30.

Fluid under pressure is then admitted through the line 36 to the pneumatic bag 35 which expands to further urge the upper platen 31 and upper die 28 against the lower platen 30 and lower die 29 to apply additional molding force upon the charge 16. This additional molding force is applied and maintained upon the charge 16 until the pressure is released from the pneumatic bag 35. With the additional molding force applied, the press is released by removing the press force from the press heads 64 and 65 and then opening the carriages 46 and 47. With the carriages 46 and 47 backed away from the mold assembly, the conveyor 11 is then started to move the latched mold assembly towards the unloading area, as shown in FIG. 1. While the latched press assembly is moving toward the unloading area, a subsequent mold assembly can be loaded in the manner previously described so that the single press is continually utilized during the cure period for mold assemblies already loaded.

It is to be understood that FIG. 1 only illustrates certain structural features of the types of apparatus which can be utilized to carry out the principles of this invention which are realized when two or more mold assemblies are used with a single press. Other means for transferring the press assemblies and particularly the upper die half 26 can be utilized.

In the FIG. 1 embodiment, as soon as the predetermined cure interval has expired, the pneumatic bag 35 is deflated, the upper half assembly 26 is picked up by the hoist 25, to automatically release the latches 37 and the formed part is removed by the unloading device 17. The upper half assembly 26 is then returned by the trolley 24 to the loading area.

Figure 2:
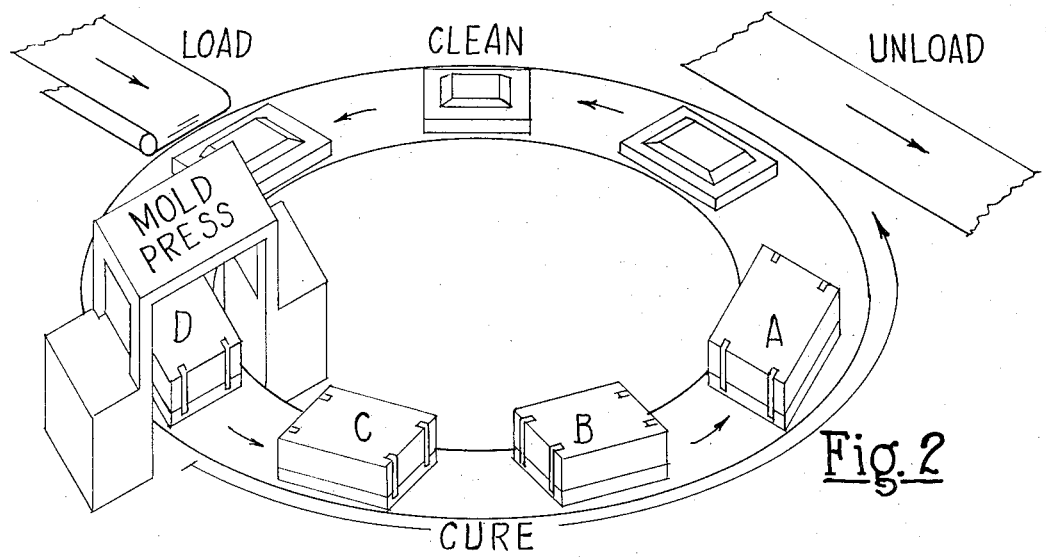
FIG. 2 is a schematic view in perspective of another form of the molding system of this invention in which the latched mold devices and single press are utilized with a circular conveyor for transferring the mold assemblies through a complete molding cycle with the press.

FIG. 2 shows another type of continuous molding apparatus which utilizes the principles of this invention with a circular or carousel-type transfer device. A single mold press, which may be of the type previously described with reference to the FIG. 1 embodiment, is used to load a latching type mold which contains an expansion means for applying and maintaining additional molding pressure upon the mold independently of the press. After being loaded, each mold is moved by the circular conveyor towards an unloading station while subsequent latching molds are being loaded. Thus as shown, mold assemblies A, B and C have been sequentially loaded by the molding press and are moving toward the unloading station. At the unloading station, the formed article is removed and the lower half of the mold remains on the carousel conveyor to pass through a cleaning and loading station and then return to the press. The upper half of the mold can be independently returned to the molding press from the unloading station or, can follow its lower half around the circle by an overhead circular conveyor system (not shown).

It is to be understood that the particular mechanisms for transferring the mold halves from the press to the unloading station and returning them will depend upon the type of installation, the volume output, and the size of the press being used, etc. In addition, the details of the mold assemblies will vary in accordance with the type and size of product being molded and the molding material used. When using thermoplastic or thermosetting materials, heating and/or cooling means for the dies may be included in the mold assemblies, along with appropriate controls therefor.

Using the concepts of the embodiments previously described, a single molding press with multiple latching mold assemblies can be used for the high volume production of large molded parts, particularly with thermosetting materials which requires a substantial cure time prior to opening the mold. Such a system alleviates the necessity of using a plurality of expensive, high tonnage presses and makes possible the installation of a high volume system at a comparatively low cost. Other advantages of the invention will be apparent to those skilled in the art and may be made without departing from the spirit and scope of the following claims.

I claim:

1. A process for the high speed molding of a plurality of articles of hardenable material which requires each article to be maintained under pressure for a predetermined cure interval comprising the steps of placing in a single molding press a first open mold assembly having spaced apart matching dies between mold platens and having a mechanical latch for securing said platens and dies together in closed position, closing said press to apply and maintain a first molding force directly upon said mold platens to close said platens and latch them in a closed position, applying additional molding pressure to said dies in said closed position against said mechanical latch by a pressure means independent of said molding press to attain a final pressure which is equal to the sum of said first molding pressure and said additional molding pressure, removing said latched mold from said press and maintaining it in said closed position while maintaining at least said additional pressure thereon for said predetermined cure interval, thence removing all pressure from said mold, unlatching said mold, and removing the molded article therefrom.

2. A process for the high speed molding of a plurality of articles of hardenable material wherein each article is maintained in a mold for a predetermined cure interval comprising the steps of (1) placing in a single molding press a first open mold assembly having spaced apart matching dies between platens and which includes a mechanical latch for securing together said platens and dies in closed position under a first molding pressure and an inflatable expansion member positioned outside of said platens and within the grip of said mechanical latch which, when expanded, will exert additive molding pressure upon said platens and dies in said closed position against said mechanical latch to attain a final molding pressure which is equal to the sum of said first and said additive molding pressure, (2) placing a charge of molding material between said open dies, (3) closing said press directly upon said platens to move said dies to closed position and initially form said molded article, (4) mechanically latching together said platens and dies, (5) inflating said expansion member to exert said additive molding pressure upon said platens and dies against said latch means in said closed position, (6) removing said latched mold assembly from said press while maintaining at least said additional pressure thereon for said predetermined cure interval while subsequent mold assemblies are acted upon by said press, (7) deflating said expansion member on said first mold after expiration of said predetermined cure interval, and (8) unlatching said first mold and removing the formed article therefrom.

3. A method of sequentially forming a plurality of molded articles of a hardenable material having a predetermined cure interval with a single molding press comprising the steps of closing said molding press directly upon a mold assembly to apply and maintain molding pressure directly upon the dies therein to move them to a closed position, securing together said dies in said first mold in said closed position, applying additive molding pressure upon said dies in said closed position against said securing means by a pressure means independent of said single molding press to attain a final molding pressure which is the sum of said molding pressure and said additive molding pressure, removing said mold assembly from said press while maintaining at least said additional pressure thereon in said closed position for said predetermined cure interval and, thence releasing all said pressure, releasing said securing means and removing the molded article from said mold.

4. A method of sequentially forming a plurality of molded articles of a hardenable material having a predetermined cure interval with a single molding press and a plurality of individual molds, said molding press including means for pressing said molds together and laterally movable clamping means for positioning said molds opposite each other in precise molding alignment, each mold including a pair of separate platens with a die half associated with each platen, means for latching together said platens when in aligned and closed position and fluid pressure expansion means positioned outside of said platens and within the grip of said latching means for applying additive molding pressure upon said die halves within said latched platens, said method comprising the steps of placing a first mold half within said molding press, positioning a second mold half in general molding alignment with but spaced from said first mold half, laterally moving said clamping means against said first and second mold halves to precisely position them in molding alignment, closing said press to apply and maintain initial molding pressure directly upon said platens and die halves to move them to a closed position, latching together said platens in said closed position, inflating said fluid pressure means to apply an additive molding pressure upon said platens and die halves in said closed position for attaining a final molding pressure which is equal to the sum of said initial pressure and said additive pressure, opening said press and moving said pressurized latched mold from said press while maintaining at least said additional pressure for said predetermined cure interval, and subsequently deflating said fluid pressure means, unlatching said platens and removing the molded part while subsequent mold halves are being utilized in said press.

5. A process for the high speed molding of a plurality of articles of hardenable material which requires each article to be maintained in the mold for a predetermined cure interval comprising the steps of placing in a molding press a mold assembly having spaced apart matching dies between mold platens and having a mechanical latch for securing said platens and dies together, closing said press to apply molding force directly upon said mold platens to close said platens and applying additive molding pressure to said dies against said mechanical latch by a pressure means independent of said molding press to attain a final molding pressure which is equal to the sum of said molding pressure and said additive pressure, removing said latched mold from said press and maintaining it in said closed position under at least said predetermined pressure for said predetermined cure interval, thence removing all pressure from said mold, unlatching said mold, and removing the molded article therefrom.

6. A process for the high speed molding of a plurality of articles of hardenable material wherein each article is maintained under pressure for a predetermined cure interval comprising the steps of (1) placing in a single molding press a mold assembly having opposed matching dies between platens and which includes a mechanical latch for securing together said platens and dies and an inflatable expansion member positioned outside of said platens and within the grip of said mechanical latch which, when expanded, will exert additive molding pressure upon said platens and dies in said closed position against said mechanical latch, (2) closing said press directly upon said platens to move said dies to closed position under a first molding pressure and inflating said expansion member to exert an additive molding pressure upon said platens and dies against said latch means in said closed position to attain a final molding pressure which is equal to the sum of said first and second molding pressure, (3) removing said latched mold assembly from said press and maintaining it in latched closed condition under at least said predetermined pressure for said predetermined cure interval.

References Cited

UNITED STATES PATENTS

| | | | |
|---|---|---|---|
| 2,485,452 | 10/1949 | Lyijynen | 425—422 X |
| 3,135,640 | 6/1964 | Kepka et al. | 264—314 X |
| 2,869,174 | 1/1959 | Van Hartesveldt | 425—457 X |
| 2,411,043 | 11/1946 | Klassen | 144—281 |
| 2,921,355 | 1/1960 | Gould et al. | 425—423 X |

JAN H. SILBAUGH, Primary Examiner

U.S. Cl. X.R.

264—314, 325; 425—346, 389, 411